W. A. KIRBY.
Harvester.
No. 3,199. Reissued Nov. 17, 1868.
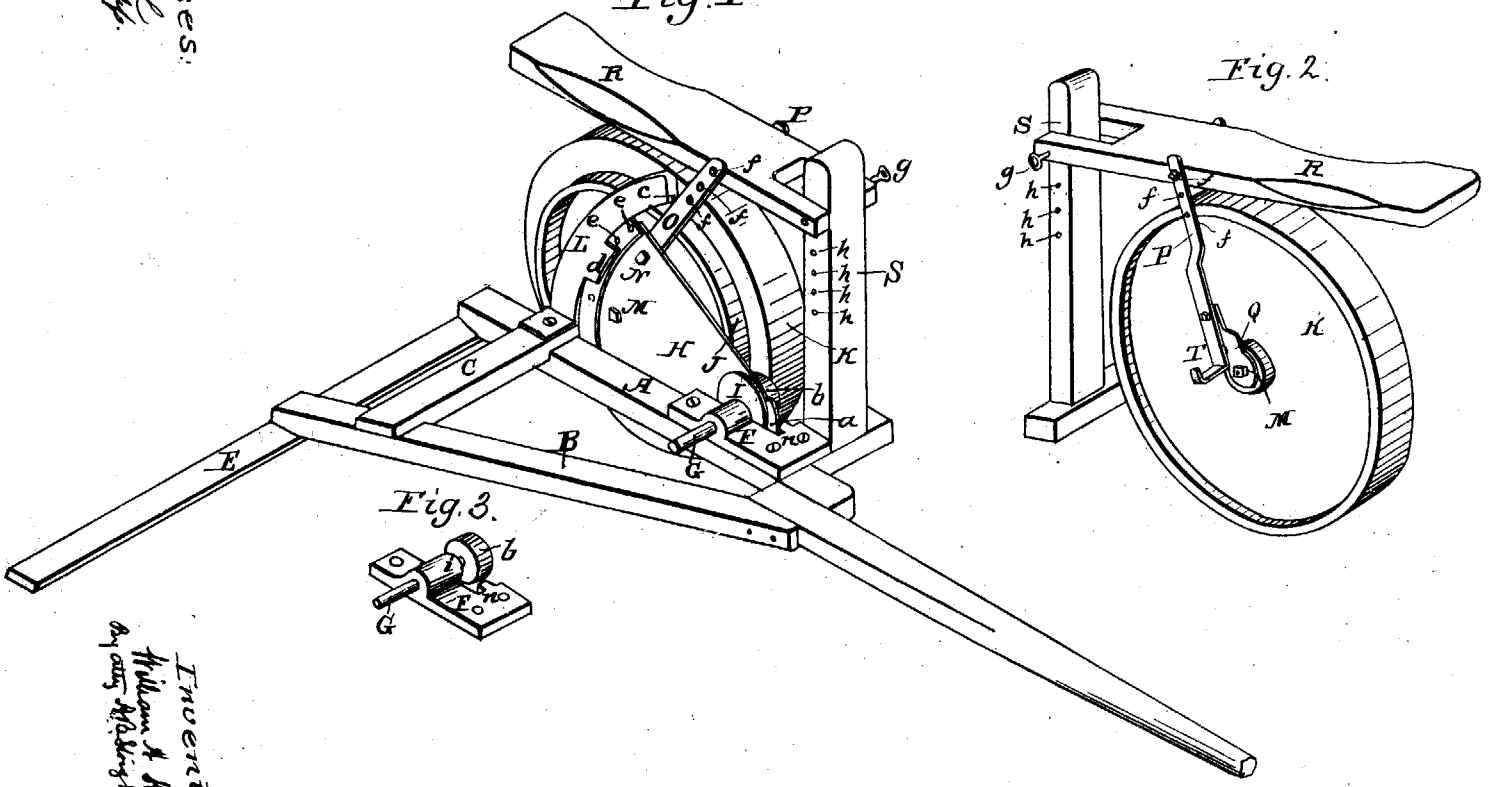
Witnesses:
S. M. Pool
E. H. Phillips.
Inventor
William A. Kirby
By atty A. P. Stringham.
N. PETERS, Photo-Lithographer, Washington, D. C.

UNITED STATES PATENT OFFICE.

WILLIAM A. KIRBY, OF AUBURN, NEW YORK.

IMPROVEMENT IN HARVESTING-MACHINES.

Specification forming part of Letters Patent No. 15,659, dated September 2, 1856; Reissue No. 673, dated March 15, 1859; Reissue No. 3,199, dated November 17, 1868.

*To all whom it may concern:*

Be it known that I, WILLIAM A. KIRBY, formerly residing in Buffalo, in the State of New York, now of Auburn, in the county of Cayuga and State of New York, have invented certain new and useful Improvements in Harvesting-Machines; and I do hereby declare the following to be a full, clear, and exact description of the construction and operation of the same, reference being had to the accompanying drawings, making a part of this specification, in which—

Figure 1 represents in perspective so much of a harvesting-machine as will illustrate my invention. Fig. 2 represents a perspective view taken from the opposite side of the machine from that shown in Fig. 1, and illustrates the manner of supporting the seat and driver on the main wheel. Fig. 3 represents in perspective a portion of the frame and gearing detached from the machine to better illustrate their characteristics.

Similar letters of reference, where they occur in the separate figures, denote like parts of the machine in all of the drawings.

This invention relates to a harvesting-machine in which the main frame is wholly on one side of the driving-wheel, and in which said driving-wheel has no outside support, but which has a foot-support for the driver on the side of the wheel opposite to the main frame; and the invention further relates to a harvesting-machine with the frame wholly on one side of the driving-wheel, and the driving-wheel having no outside support, and the frame in two parts, one of which supports the driving-wheel and a portion of the gearing, and the other part carrying the other portion of the gearing, and a projection formed on one part of the frame around the pinion-shaft and a corresponding opening int he other part, which will pass over and around said projection, thus forming a joint the center of which is coincident with the center of the pinion-shaft, for the purpose of holding the two parts with their gearing in position longitudinally; and the invention further relates in a harvesting-machine having its frame in two parts, one of which supports the driving-wheel and a portion of the gearing, and the other part carries the other portion of the gearing, the use of a lug on one part of the frame and a corresponding recess on the other part thereof, in which said lug works, for the purpose of holding the two parts, with their gearing, in position laterally.

To enable others skilled in the art to make and use my invention, I will proceed to describe the same with reference to the drawings.

The main frame of the machine, calling that the main frame which carries the gearing or moving or driving parts of the machine, is composed of two parts—viz., the triangular part A B C and the part H, hinged thereto—each of these parts carrying a portion of the driving-gear, as follows: The triangular part carries the shaft G and the pinion *b*, while the other part, H, carries the main wheel K, or forms a support for it, and said wheel has upon it the cogged rim J, which takes into the pinion *b*, giving it and its shaft G motion, which motion is transmitted to the cutter-bar to drive it, and through the hinged joint or connection between the two frames or portions of frames.

The tongue D is connected to the triangular portion of the frame rigidly at its front portion and the finger-bar E at its rear portion.

On the piece A of the frame there is a metallic box, block, or bearing, F, through which the shaft G passes, and in which it is supported. A hub, *i*, projects from this block F, on which is placed the other portion of the frame H, which has an opening through it, that will slip over the projection *i* and turn upon it and freely move thereon as the two parts of the frame work upon each other. There is also a flange, *a*, on the piece H, which projects into a slot or recess, *n*, in the block, box, or bearing F, to steady said piece H on its journal or bearing *i* when turning thereon, and which prevents it from slipping laterally on said bearing to any injurious extent, or keeping them in proper gearing position. The object and purpose of hanging the piece or part H upon the hub or projection *i* are that it may turn on a bearing of which the shaft G is a center and without turning on the shaft itself, which would from its rapid motion soon so wear itself or the hub or bearing of the piece H, or both, as to produce a shackling, noisy, and irregular motion; and, besides, it takes the strain and friction from the shaft and transfers it to the frame; and the object and purpose of the flange or guide *a* working in the recess *n* or against lateral supports are to keep the piece H upon its bearing and prevent it from moving laterally.

A pulley, *b*, is fastened on the shaft G, which may bear against a circular flange, J, on the inner face of the main driving-wheel K, so as to receive motion therefrom; or *b* may be a cogged pinion and the flange J a cogged rim or flange taking into it to drive it; or an endless belt or chain may be used around the two, the object being to get motion from the main drive-wheel and transmit it through the gearing to the cutters, or to a reel or rake, as may be desired.

L is a segmental rim supported on the piece *c* of the frame, and is furnished with a groove or way, *c*, in its inner perimeter, in which groove or way *c* the outer edge of the piece H moves and is supported. A projecting piece, *d*, is also formed on the inner perimeter of the rim L, against which an adjusting-pin placed in one of the series of holes *e e*, &c., may take or catch to hold the frame at a proper adjustment or position on the main wheel K.

On the part or piece H is wrought or cast a journal, M, for supporting the main wheel, or for supporting the frame in the main wheel, and to said piece H there is also pivoted by a bolt or pin, N, a brace or support, O, provided with a series of adjusting-holes, *f f*, &c.

A support or brace, P, corresponding to that of O on the opposite side of the wheel, is pivoted to an arm, Q, connected with or fastened to the journal or axle M of the main wheel K, and at the outer extreme end of said journal or axle, as seen in Fig. 2, and similarly provided with adjusting-holes *f f*, &c. To these two braces or supports O P is hung or supported a seat, R, (for the driver or conductor of the machine to ride upon,) which, besides having a pivoted connection with the supports, is also hinged and made adjustable in the standard S by a pin, *g*, which may pass through its end and through said standard at any of the adjusting-holes *h*, &c. The lower end of the brace or support P may be formed into a stirrup, T, to make a foot-support for the driver, the axle M being the principal supporting part of said stirrup, inasmuch as the support P is connected to or with the outer end of said axle, and thus forms the place for the stirrup.

By pivoting the part or piece H, as above stated, to the other part of the main frame, and hanging the wheel K to said part H, and also pivoting the seat R (which is also a lever) to the piece or part H and the standard S, which latter is a part of or fastened to the main frame, the frame can be raised or lowered and balanced on the wheel at pleasure; but in raising or lowering the main frame the position of the seat R changes, for it may be used as a lever by which the raising and lowering may be done, and some provision must be made for bringing it back into an effective or convenient position again. This is done by the adjustments heretofore mentioned in the braces O P and standard S. By these connections, too, I not only make the adjustments that are necessary for high or low cutting with great facility, but I dispense with much of the framework heretofore used, and consequently make the machine lighter and cheaper than heretofore done, dispensing with all kinds of frame on the out or stubble side of the main wheel and placing said frame entirely on the in or grain side of said wheel.

The peculiar position and manner of hanging the seat makes the weight of the driver or conductor on its rear portion act as a counterpoise or balance to raise and hold up the front part of the machine, or aid in so doing.

The pin used in the holes *e* of the piece or part H is inserted underneath the projection *d* of the rim or guide L, so that when the machine is cutting close to the ground, or the frame is on or close to the ground, and the driving-wheel K should drop into a depression of any kind, it will still be in contact with the ground and continue to drive the cutters, which it could not do were it permanently adjusted to the main frame and said frame come in contact with the ground.

Any sudden jar communicated to a harvesting-machine with a stiff tongue is brought violently upon the necks of the horses that draw it; but by my manner of hanging the seat the weight of the driver, when the machine strikes any obstacle, tends to raise up the machine, ease the jar, and thus relieve the horses.

It will be perceived that I have no main frame outside of the main wheel, but simply a seat-support and foot-rest, which are connected to the extreme outer end of the journal or axle of the main wheel, and which aid the driver in converting his seat into a lever for raising up or easing the machine over any obstruction in its path.

The entire main frame is on the cutter-bar side of the main wheel, and there is but one support to the journal or axle of the main wheel, and that on the side where the main frame is placed.

Having thus fully described my invention, what I claim under this patent, and desire to secure by Letters Patent, is—

1. In a harvesting-machine with its frame wholly on one side of the driving-wheel and the driving-wheel having no outside support, a foot-support for the driver on the side of the wheel opposite the frame, substantially as described.

2. In a harvesting-machine with a frame wholly on one side of the driving-wheel and said driving-wheel having no outside support, the making of the frame in two parts, one of which supports the driving-wheel and a portion of the gearing, and the other part carries the other portion of the gearing, and forming a projection on one part of the frame around the pinion-shaft, and a corresponding opening in the other part, which will pass over and around said projection, thus forming a joint the center of which is coincident with the center of the pinion-shaft, for the purpose of holding their gearing in position longitudinally, substantially as described.

3. In a harvesting-machine having its frame in two parts, one of which supports the driving-wheel and a portion of the gearing, and the other part carries the other part or portion of the gearing, and jointed together by the projection on one and the opening in the other, as described, the use of the lug, flange, or guide *a* on one part of the frame and a corresponding recess, *n*, on the other part thereof, in which said lug, flange, or guide works, for the purpose of holding the two parts, with their gearing, in position laterally, so as to prevent motion to either side, substantially as described.

WM. A. KIRBY.

Witnesses:
E. B. IVES,
F. WRIGHT.